US005351104A

United States Patent [19]

Glover et al.

[11] Patent Number: 5,351,104

[45] Date of Patent: Sep. 27, 1994

[54] PHOTOGRAPHIC PROCESSING APPARATUS

[75] Inventors: Edward C. T. S. Glover, London; Peter D. Marsden; James I. Dunlop, both of Middlesex, all of United Kingdom

[73] Assignee: Eastman Kodak Company, Rochester, N.Y.

[21] Appl. No.: 39,257

[22] PCT Filed: Oct. 11, 1991

[86] PCT No.: PCT/EP91/01935

§ 371 Date: Apr. 15, 1993

§ 102(e) Date: Apr. 15, 1993

[87] PCT Pub. No.: WO92/07301

PCT Pub. Date: Apr. 30, 1992

[30] Foreign Application Priority Data

Oct. 19, 1990 [GB] United Kingdom ................. 9022779

[51] Int. Cl.[5] ................................................ G03B 3/04

[52] U.S. Cl. .................................................... 354/328

[58] Field of Search ................ 354/328, 329, 318-324; 134/64 P, 64 R, 122 P, 122 R

[56] References Cited

U.S. PATENT DOCUMENTS 5,023,644 6/1991 Kurematsu et al. ............ 354/328 X

FOREIGN PATENT DOCUMENTS 2531873 2/1976 Fed. Rep. of Germany ...... 354/328
64-44938 2/1989 Japan .
WO91/12567 8/1991 PCT Int'l Appl. .
1268126 3/1972 United Kingdom .
1399481 7/1972 United Kingdom .
1403418 8/1975 United Kingdom .
1560572 2/1980 United Kingdom .
2139525A 11/1984 United Kingdom .

*Primary Examiner*—D. Rutledge
*Attorney, Agent, or Firm*—Nixon, Hargrave, Devans & Doyle

[57] ABSTRACT

When using unstable processing solutions, high recirculation and/or replenishment rates may be required. However, this may result in non-uniform processing of photographic material in processing apparatus using such solutions. Described herein is apparatus in which agitation members (17) are provided in the processing tank. The members (17) are fixed to a wall (11) of the tank at a location (18). The member (17) has a free end (25) which is positioned to lie against emulsion surface (26) of material (20) being processed (or against inner wall surface (19) if no material (20) is present). As material (20) is moved along path (13).

6 Claims, 4 Drawing Sheets

PHOTOGRAPHIC PROCESSING APPARATUS

FIELD OF THE INVENTION

This invention relates to photographic processing apparatus and is more particularly concerned with agitation of processing solutions within such apparatus.

BACKGROUND OF THE INVENTION

Conventional colour photographic silver halide materials are processed by a process which includes a colour development step. In this step silver halide is reduced to metallic silver in the light-exposed areas and the oxidized colour developer formed in this reaction then couples with a colour coupler and forms image dye. The amount of dye produced is proportional to the amount of silver halide reduced to metallic silver.

Redox amplification processes have been described, for example in British Patent Specifications GB-A-1268126, GB-A-1399481, GB-A-1403418 and GB-A-1560572. In such processes colour materials are developed to produce a silver image (which may contain only small amounts of silver) and then treated with a redox amplifying solution to form a dye image. The redox amplifying solution contains a reducing agent, for example a colour developing agent, and an oxidizing agent which is more powerful than silver halide and which will oxidize the colour developing agent in the presence of the silver image which acts as a catalyst. Oxidized colour developer reacts with a colour coupler (usually contained in the photographic material) to form image dye. The amount of dye formed depends on the time of treatment or the availability of colour coupler rather than the amount of silver in the image as is the case in conventional colour development processes. Examples of suitable oxidizing agents include peroxy compounds including hydrogen peroxide, cobalt (III) complexes including cobalt hexammine complexes, and periodares. Mixtures of such compounds can also be used.

Since the amplifying solution contains both an oxidizing agent and a reducing agent it is inherently unstable. That is to say unlike a conventional colour developer solution, amplifier solutions will deteriorate in less than an hour even if left in a sealed container. The best reproducibility for such a process has been obtained by using a "one shot" system, where the oxidant is added to the developer and the solution mixed and used immediately (or after a short built in delay) and then discarded. This leads to the maximum solution usage possible with maximum effluent and maximum chemical costs. As a result the whole system is unattractive especially for a minilab environment where minimum effluent is required. It is believed that it is these shortcomings that have inhibited commercial use of this process.

Japanese Specification 64/44938 appears to describe such a system in which a silver chloride colour material is processed in a low volume of a single-bath amplifier solution. The processes described therein however fall short of what is required in the fully commercial environment for exactly the reasons given above.

Published International Patent Application WO-A-91/12567 (which corresponds to British Patent Application No. 9003282.2) describes a method and apparatus for photographic processing in which a minimum amount of processing solution can be used in a processing tank which is thin and has a low volume. In order to overcome the inherent deterioration problem due to the instability of the processing solutions used, the method and apparatus described result in the need for high recirculation and/or replenishment rates. However, problems associated with non-uniform processing of the photographic material may be encountered due to local differences in the concentration of the processing solution. Agitation of the processing solution appears to provide one solution to this problem.

SUMMARY OF THE INVENTION

JP-A-2 135 342 discloses agitation of processing solution in a processing tank. In one embodiment, agitation is provided by a plunger-like arrangement in several processing tanks at once. In a second embodiment, agitation is provided by processing solution being pumped through a hollow member arranged in the center of the processing tank.

According to one aspect of the present invention, there is provided processing apparatus comprising a tank and a plurality of agitation member's mounted within the tank characterized in that the agitation members are positioned in the tank so as to be totally submerged by processing solution in the tank and in that the agitation members are moved into contact with at least the emulsion surface of the material being processed by motion of the material itself.

By this arrangement, the agitation members cause agitation to occur at the surface of photographic material being processed as it passes through the tank thereby producing a more uniform end result.

Advantageously, the members also maintain the position of the photographic material against one wall of the tank ensuring maximum accessibility of processing solution to the surface of the material being processed.

Preferably, the agitation members are porous. This enhances the circulation of the processing solution as it can pass through each member as well as around it.

For a better understanding of the present invention, reference will now be made, by way of example only, to the accompanying drawings in which:

DETAILED DESCRIPTION OF THE INVENTION

Figure 1:
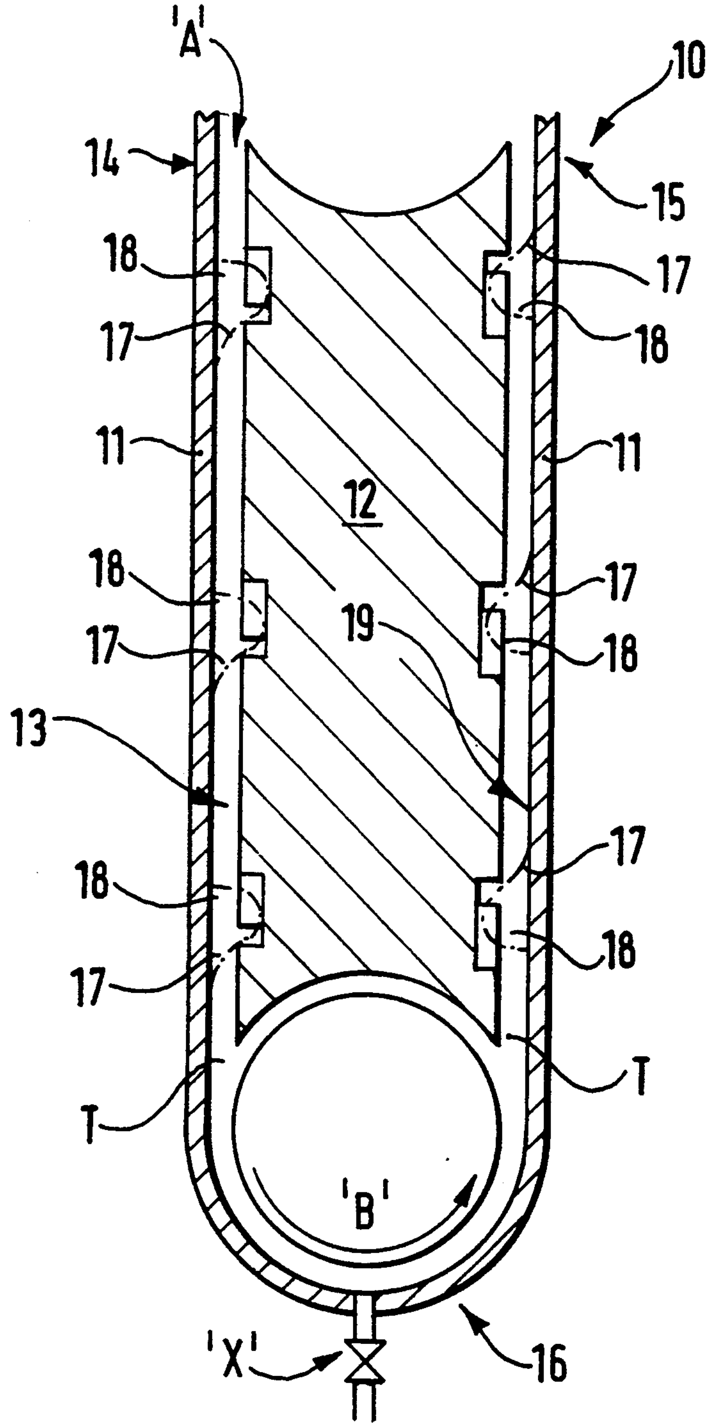
FIG. 1 is a schematic sectioned side view of a U-shaped processing tank incorporating agitation members constructed according to the invention.

In FIG. 1, a low volume thin tank 10 is shown. The tank 10 is generally U-shaped with an outer wall 11 and a central block 12 which define a path 13 for photographic material within the tank between an inlet 14 and an outlet 15. The outer wall 11 and central block 12 are separated by a distance T which is approximately 1.5 mm all the way along path 13 as shown. A valve denoted by 'X' is provided in the base of the tank 10 to allow used processing solutions to be drained from the tank.

Photographic material, for example exposed sensitized paper, (not shown) is fed into the tank 10, in the direction of arrow 'A', at the inlet 14 and is passes around a lower part 16 of the tank, in the direction shown by arrow 'B', before emerging at the outlet 15. Six agitation members or wipers 17 are positioned at spaced locations 18 around the tank in path 13, each agitation member or wiper 17 extending the full width of the tank 10.

Figure 2:
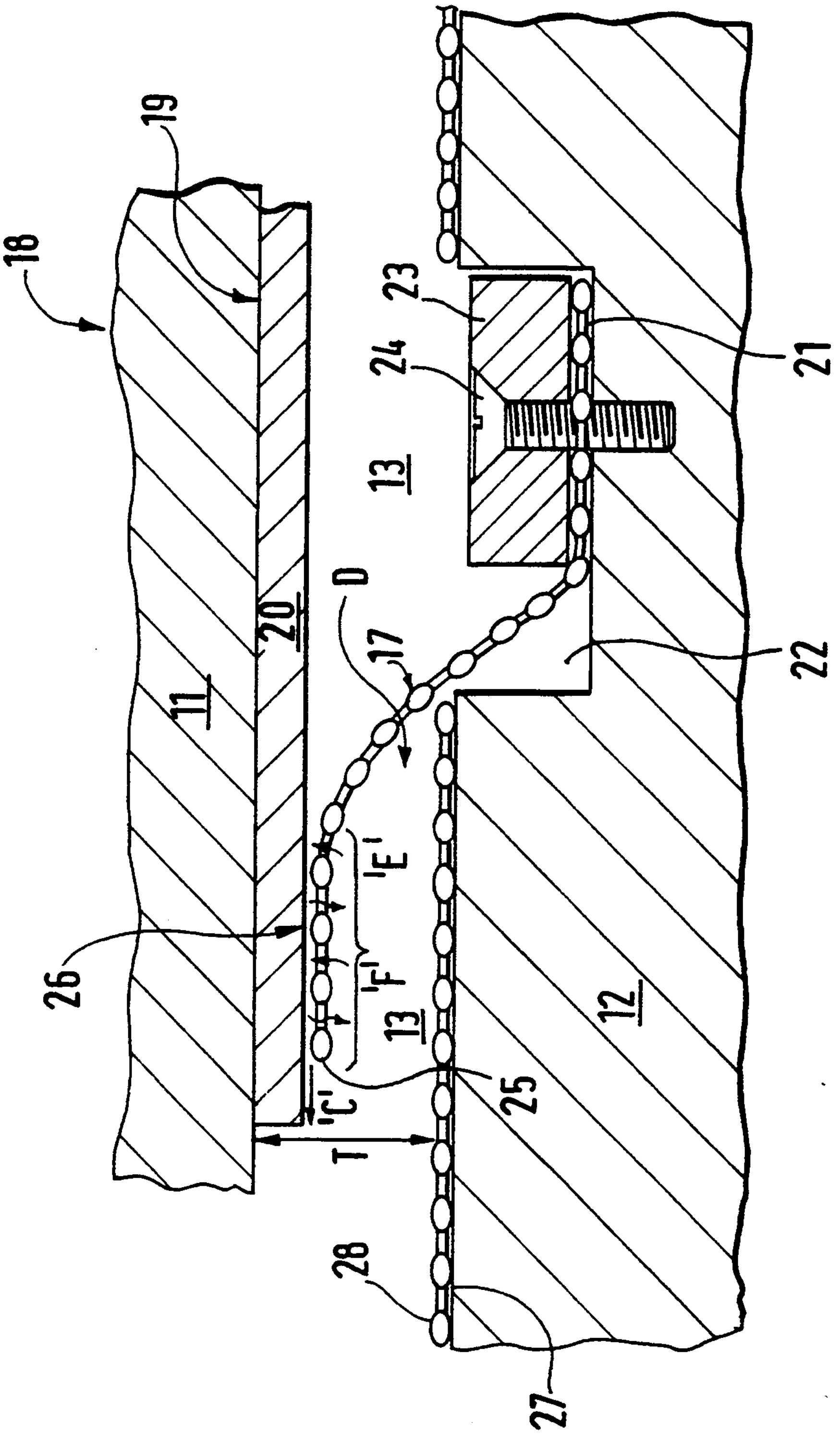
FIG. 2 is a sectioned view through the tank of FIG. 1 on an enlarged scale showing the fixing of one agitation member to the wall of the tank.

FIG. 2 illustrates one of the wiper locations 18 in more detail. At location 18, paper 20 in path 13 is pressed against wall 11 by a wiper 17. The wiper 17 is made from a porous material, for example woven nylon filament. Alternatively, the porous material could be a mesh. One end 21 of the wiper 17 is mounted in a recess 22 formed in the central block 12. The end 21 of the wiper 17 is fixed in the recess 22 by a plate 23. The plate 23 is fixed relative to the recess 22 by screws 24 (only one shown) which passes through the plate and into the central block 12. The plate 23 is not as deep as the recess 22 in which it is positioned, and has a countersunk hole as shown to allow the screw 24 to lie flush with or slightly above the upper surface of the plate itself. The arrangement of end 21 of wiper 17 and plate 23 in recess 22 is such that each wiper emerges from under the plate 23 at an angle of approximately 45°. This arrangement gives the wipers 17 the desired stiffness.

End 25 of wiper 17 is free and is positioned to lie against emulsion surface 26 of paper 20 or against inner surface 19 of wall 11 when no paper is present. As the end 25 of wiper 17 contacts the paper 20 being processed, agitation of the processing solution (not shown) in path 13 is caused at surface 26 as the paper 20 is moved along path 13. Some of the processing solution is carried along under the wiper 17, as shown by arrow 'C', and the remainder of the processing solution, indicated by arrow 'D', passes through the wiper 17 and emerges as indicated by arrow 'E'. Some flow of processing solution through the wiper 17 also occurs in the region designated as 'F'.

The wipers 17 produce agitation by disturbing the laminar layer of processing solution at the surface 26 of the paper 20 whilst allowing solution to pass through. This action mixes the development by-products with fresh solution added during replenishment to make the development process more uniform and a higher density.

The material from which the wiper 17 is made is flexible allowing it to take up the configuration shown in FIG. 2, but of sufficient stiffness to cause the paper being processed to maintain its position with the base side of the paper being held against the wall 11. This action reduces physical damage to the paper and improves solution delivery to the surface 26 of the paper 20.

It is preferred that surface 27 of central block 12 is roughened to prevent the photographic material adhering to the surface of the block. In this embodiment, the roughening is provided by a layer 28 of mesh material which is attached to the surface 27.

Figure 3:
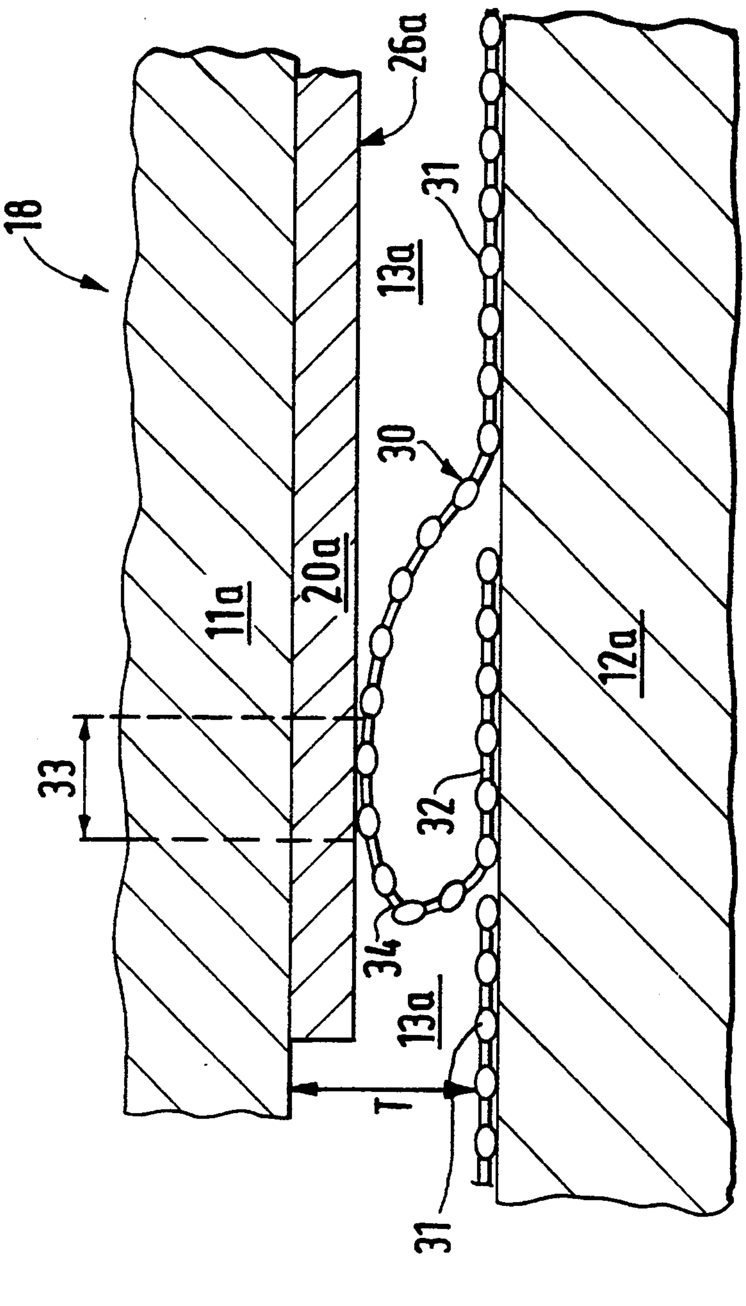
FIG. 3 is similar to FIG. 2, but illustrates a second embodiment of an agitation member constructed in accordance with the present invention.
Figure 4:
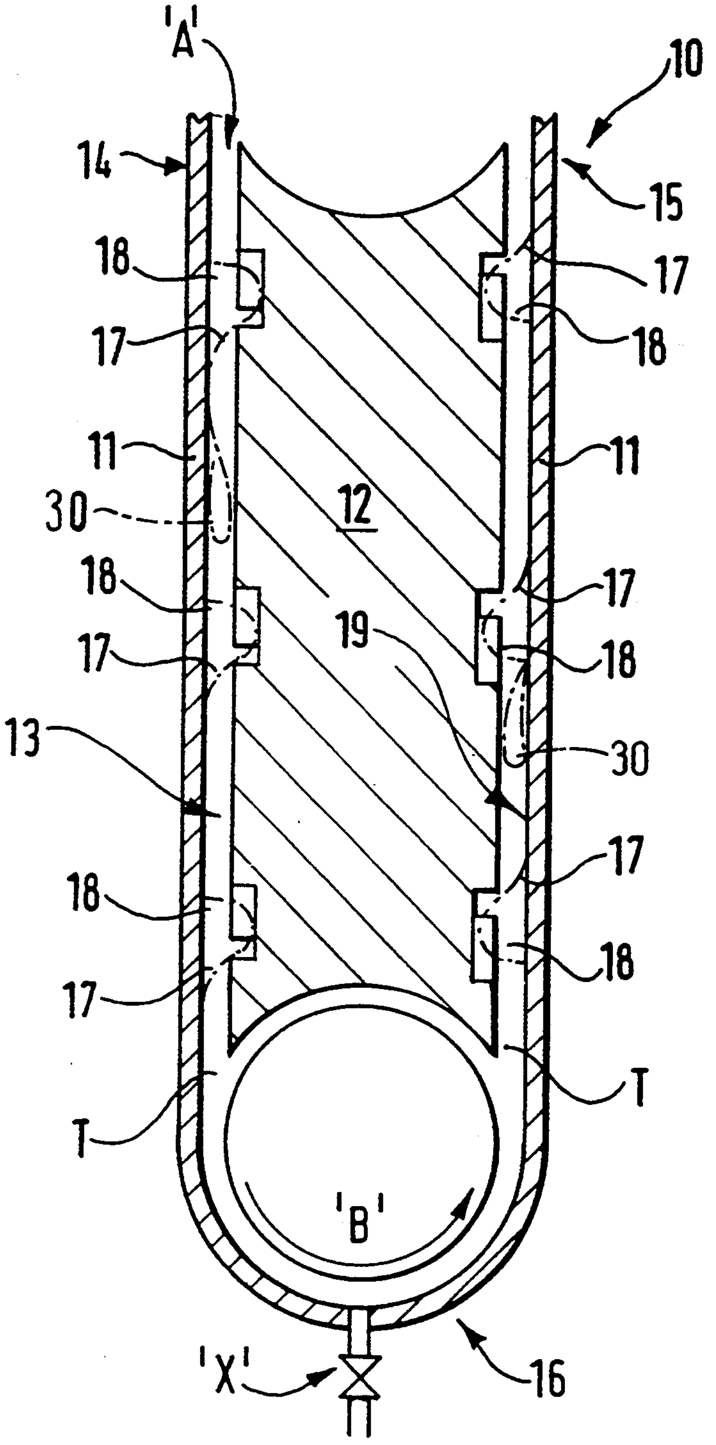
FIG. 4 is similar to FIG. 1, but illustrates an embodiment comprising wipers 17 and 30.

A second embodiment of a wiper 30 is shown in FIG. 3. Like parts are referenced alike but with a letter 'a' appended. In this embodiment, end 31 of wiper 30 is fixed to the central block **12*a* by gluing. End 32 is folded under so that it lies against the central block 12*a* and not against the paper 20*a*. A portion 33 of the wiper 30 brushes against the surface 26*a* of the paper 20*a* and produces the desired agitation. In this case, the end 31 of the wiper 30 extends to lie underneath portion 34 (formed by folding back end 32) of an adjacent wiper. This removes the need for an additional layer of mesh as shown in FIG. 2. As before, the wiper 30** is made of porous material.

In the embodiment shown in FIG. 2, each wiper 17 is made from 61 mesh (holes/inch) woven nylon filament 190 microns thick. Each wiper is approximately 10 to 15 mm long.

It is preferred that there are sufficient wipers arranged in the tank 10 so that the paper 20 passing through the tank encounters between one and two wipers per second during a thirty second development time.

The wiper 17 shown in FIG. 2 consists of a fine nylon mesh. It appears that the combined 'fineness' and stiffness of the wiper is important. Other materials could also be used instead of the mesh. For example, a continuous sheet of thin plastics or rubber material with holes punched in it may be used.

Other lengths of wiper 17 may also be found to be equally effective at producing the desired agitation. If longer wipers are used, it may be that fewer wipers would be needed as more agitation would be provided over a larger emulsion area. However, there may an optimum maximum length over which processing solution flow in the tank is restricted.

In the embodiment described with reference to FIG. 2, the free end of the wiper which lies against the surface of the material being processed is shaped to be orthogonal to the direction of motion of the material through the tank. Alternatively, the free end of the wiper could be angled to avoid drag lines being formed on the surface of the material being processed.

Instead of wipers as shown in FIGS. 2 and 3, that is, being made of porous material, they may be made from non-porous material and take the shape similar to the teeth of a comb. Naturally, the teeth of one wiper would be offset from those of an adjacent wiper so that even distribution of the processing solution is still obtained.

In the described embodiment of the tank, the wipers are mounted on the central block 12 and act to press the photographic material against the internal surface of outer wall 11. This allows maximum access of the processing solution to the surface of the photographic material being processed. In the case where the emulsion surface of the photographic material being processed needs to face the internal surface of outer wall 11 (due to apparatus constraints further along the processing path), the wipers 17 can be positioned on outer wall 11.

As an alternative, if the photographic material to be processed is double-sided, wipers may be arranged on both the internal surface of the outer wall 11 and the surface of the central block 12, the photographic material passing between the wipers as it moves along path 13.

Although the apparatus of the present invention has been described for use with photographic materials such as sensitized paper, its use is not limited to such materials only. Wipers can also be used to produce agitation of processing solutions for both single- and double-sided films.

We claim:

1. Processing apparatus comprising a tank and a plurality of agitation members mounted within the tank characterized in that the agitation members are positioned in the tank so as to be totally submerged by processing solution and in that the agitation members are moved by motion of the material being processed as at least the emulsion surface of the material being processed contacts with the agitation members.

2. Apparatus according to claim 1, wherein the agitation members are porous.

3. Apparatus according to claim 2, wherein the porous agitation members comprise 61 mesh (holes/inch) woven nylon filament.

4. Apparatus according to claim 3, wherein the filament is 190 $\mu$m thick.

5. Apparatus according to claim 1, wherein each agitation member has an operational length of between 10 and 15 mm.

6. The apparatus according to claim 1 further comprising a second plurality of agitation members mounted within the tank on a side substantially opposite from said other plurality of agitation members.

* * * * *

UNITED STATES PATENT AND TRADEMARK OFFICE

CERTIFICATE OF CORRECTION

Patent No.: 5,351,104

Dated: September 27, 1994

Inventors: Edward C.T.S. et al

It is certified that error appears in the above-identified patent and that said Letters Patent is hereby corrected as shown below:

Title page, item [57], col. 2,

In the Abstract, last line, after "(13)" insert --agitation of the processing solution is achieved as some of the solution is carried along under the member (17) and the remainder passes through the member (17) itself--

Signed and Sealed this

Third Day of January, 1995

Attest:

BRUCE LEHMAN

*Attesting Officer* *Commissioner of Patents and Trademarks*